United States Patent
La Sala et al.

(10) Patent No.: US 11,946,115 B2
(45) Date of Patent: Apr. 2, 2024

(54) PROCESS FOR THE DESULPHURIZATION OF MATERIALS AND/OR RESIDUES CONTAINING LEAD SULPHATE EMPLOYING AN AMINO COMPOUND

(71) Applicant: STC S.R.L. SCIENCE TECHNOLOGY & CONSULATING, Mesagne (IT)

(72) Inventors: Giorgio La Sala, Corigliano-Rossano (IT); Francesco Scura, Mesagne (IT); Gianluca Fusillo, Monopoli (IT)

(73) Assignee: STC S.R.L. SCIENCE TECHNOLOGY & CONSULTING, Mesagne BR (IT)

( * ) Notice: Subject to any disclaimer, the term of this patent is extended or adjusted under 35 U.S.C. 154(b) by 725 days.

(21) Appl. No.: 17/054,057

(22) PCT Filed: May 6, 2019

(86) PCT No.: PCT/IT2019/050091
§ 371 (c)(1),
(2) Date: Nov. 9, 2020

(87) PCT Pub. No.: WO2019/215770
PCT Pub. Date: Nov. 14, 2019

(65) Prior Publication Data
US 2021/0246528 A1     Aug. 12, 2021

(30) Foreign Application Priority Data
May 11, 2018  (IT) .................. 102018000005267

(51) Int. Cl.
*C22B 3/00* (2006.01)
*C22B 7/00* (2006.01)
(Continued)

(52) U.S. Cl.
CPC ............ *C22B 13/045* (2013.01); *C22B 7/006* (2013.01); *H01M 10/06* (2013.01); *H01M 10/54* (2013.01)

(58) Field of Classification Search
CPC ...... C22B 13/045; C22B 7/006; H01M 10/06; H01M 10/54
See application file for complete search history.

(56) References Cited

U.S. PATENT DOCUMENTS

2007/0028720 A1   2/2007  Sommariva et al.
2021/0246528 A1*  8/2021  La Sala .................. H01M 10/06

FOREIGN PATENT DOCUMENTS

CN    102689921 A    9/2012
CN    14103523820 A  1/2014
(Continued)

OTHER PUBLICATIONS

English language translation of CN 102689921B (Year: 2017).*
(Continued)

*Primary Examiner* — Scott R Kastler
(74) *Attorney, Agent, or Firm* — TAROLLI, SUNDHEIM, COVELL & TUMMINO L.L.P.

(57) ABSTRACT

The present invention claims a process for the desulphurization of materials and/or residues containing lead sulphate, carried out in one or more stages. The main characteristic of this process is that the only desulphurising agent is an amino compound selected among urea, guanidine, guanine, arginine or another similar amino compound.

14 Claims, 2 Drawing Sheets

Figure 1:
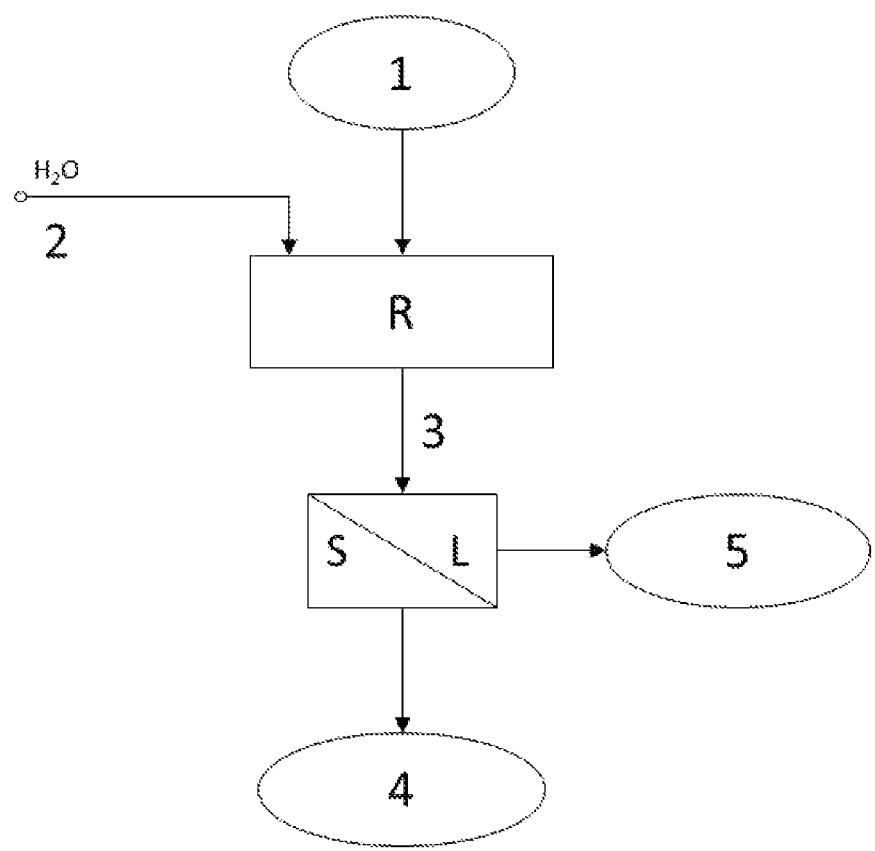

(51) Int. Cl.
  *H01M 10/06*  (2006.01)
  *H01M 10/54*  (2006.01)

(56) References Cited

FOREIGN PATENT DOCUMENTS

CN   104263944 A   *   1/2015   ............ C22B 13/00
CN   106916952 A   *   7/2017

OTHER PUBLICATIONS

Volpe, M., et al.; "Metallic lead recovery from lead-acid battery paste by urea acetate dissolution and cementation on iron"; Hydrometallurgy, Elsevier Scientific Publishing CY. Amsterdam, NL, (https://doi.org/10.1016/i.hydromet.2008.09.001); vol. 96, No. 1-2, Mar. 1, 2009, pp. 123-131.
Applicant: STC S.R.L. Science Technology & Consulting; PCT International Application No. PCT/IT2019/050091; PCT Filing Date: May 6, 2019; International Search Report and Written Opinion; Authorized Officer: Matjaz Juhart; Date of Completion: Jun. 27, 2019; 9 pgs.

* cited by examiner

PROCESS FOR THE DESULPHURIZATION OF MATERIALS AND/OR RESIDUES CONTAINING LEAD SULPHATE EMPLOYING AN AMINO COMPOUND

The present invention claims a process for the desulphurization of materials and/or residues containing lead sulphate, such as the paste deriving from the recovery of exhausted lead acid batteries, through the use of urea or another similar amino compound.

In industrial practice, the paste deriving from the recycling of exhausted lead acid batteries (mainly composed of lead sulphate and generally smaller quantities of lead dioxide, lead alloys and other lead compounds), is used as secondary raw material in primary or secondary lead smelters. In some cases, after a desulphurization operation, consisting in treating the paste in an aqueous suspension with an alkaline carbonate which converts the lead sulphate into a carbonate, the paste is then used as raw material in small reduction furnaces for the production of secondary lead.

Various patents have been published on this topic.

One of these (1978—Striffler, Kolakowski; U.S. Pat. No. 4,220,628) describes a desulphurization treatment via carbonatation with ammonium carbonate. There are different works that describe the desulphurization process via sodium carbonate or bicarbonate (1986—Olper; U.S. Pat. No. 4,769, 116. 1999—Prengaman; U.S. Pat. No. 6,177,056B 1).

Some patents contemplate a paste desulphurization treatment with an alkaline hydrate and the resulting desulphurised product is used as raw material in electrolytic processes for the production of lead, both in aqueous solution (1988—Olper; U.S. Pat. No. 4,769,116) and in molten salts (1998—Margulis; U.S. Pat. No. 5,827,347).

In all the above cases, the processes imply some application problems such as the necessary desulphurization reagents procurement difficulties or the management of the reaction by-products, which are difficult to purify or at least difficult to place on the market or, worst-case scenario, to be disposed of in landfills. A further limiting factor is the poor desulphurization yield achievable with those reagents, unless very slow and complex processes are employed, with subsequent use of a great number of machines and long working periods.

The Patent application CN103523820A contemplates a paste desulphurization treatment via regular desulphurising agents such as sodium carbonate, ammonium carbonate, ammonium bicarbonate, with the addition of an amino compound preferably selected among ammonium solution, urea, ethylenediamine, diethylenetriamine, triethylenediamine.

Since not indicated in any description or example, we implicitly assume that operational conditions of the desulphurization stage can occur in ambient conditions. Under these conditions, it is evident that urea is only minimally or totally not reactive. Furthermore, it is evident that the entire desulphurization reaction is carried out by the other compounds present in the reaction environment, such as carbonates and bicarbonates. In addition, in this case, the process claimed in the Chinese patent implies some application problems such as the necessary desulphurization reagents procurement difficulties or the management of the reaction by-products, which are difficult to purify or at least difficult to place on the market.

The Patent application CN 102689921A contemplates a lead paste treatment via complexing agents such as mixtures of different compounds, containing also urea.

Furthermore, the only indicated operative condition is temperature, with a general range of 1000 degrees Celsius. Since not indicated in any description and/or example, we implicitly assume that the complexing stage can occur at ambient pressure (1 atmosphere). Under these conditions, it is evident that urea is only minimally or totally not reactive.

Also in the only example where urea is mentioned, it is used in combination with other seven different substances and the reaction temperature is between 20-90 degrees Celsius for 30 minutes. Also under these conditions, it is evident that urea is only minimally or totally not reactive.

Moreover in all other reported examples, the complexing reaction of lead paste is always conducted at a temperature below 95 degrees Celsius.

A new, surprisingly fast and low-cost process has now been discovered, which allows the desulphurization of materials containing lead sulphate and possibly lead oxides, such as the paste deriving from recycled acid batteries.

The process, claimed in the present invention, implies the use of one amino compound selected among urea, guanidine, guanine, arginine or others. The selected compound is the only desulphurising agent added to the material that has to be desulphurised. This process is carried out without using regular desulphurising agents (e.g. sodium carbonate, ammonium carbonate and/or ammonium bicarbonate, as explained in the patents mentioned above).

Compared to processes where non-amino compounds are used, the claimed process considerably increases the yields of reaction.

Compared to processes where other amino compounds are used (e.g. ammonium carbonate, ammonium bicarbonate, etc.), the claimed process widely solves environmental, pollution and safety issues related to production, transport, storage and handling of those compounds.

The preferred and recommended amino compound is urea.

If urea is used, the supply chain is also significantly simplified since the global average urea amount is considerably higher compared to other amino and ammonia compounds. Moreover, as urea is characterized by a high level of stability (high decomposition temperature), it does not cause potentially dangerous gas emissions during critical stages of transportation and storage.

The desulphurization process, claimed in the present application, can be carried out in one single stage or multi-stages, according to the way the used amino compound reacts with the material that has to be desulphurised directly in one stage or with a previous activation step of the selected amino compound.

During the single-stage process, both the material containing lead sulphate and the amino compound are charged into the same reactor.

The chemistry of this reaction leads to the formation of two main products: lead carbonate (insoluble) and ammonium sulphate (soluble).

The amount of amino compound has to cover at least the stoichiometric molar ratio with the lead sulphate contained in the paste.

It is possible, if necessary, to use a slight excess of amino compound, as contemplated in all other desulphurization processes described in literature.

The process is preferably carried out in a closed reactor where the amino compound, preferably urea, in aqueous solution between 20% and 50% m/v, directly reacts with the material that has to be desulphurised, at the following operational conditions:

Temperature preferably between 50 and 190° C., more preferably between 90° and 190° C., even more preferably between 130° and 180° C.;

Pressure preferably between 1 and 12 atmospheres (atm), more preferably between 2 and 12 atm, even more preferably between 4 and 12 atm;

Reaction time preferably between 5 and 120 minutes (min), more preferably between 10 and 100 min;

Liquid/solid ratio m/m preferably between 0.5 and 4, more preferably between 1 and 4.

The desulphurization yields under such conditions can even be higher than 99%.

The multi-stage process can be carried out when the paste suspension is not directly in contact with the solution containing the selected dissolved amino compound. The solution reacts, instead, in a separate reactor with the selected amino compound previously "activated" through distillation or flash, or other similar processes.

The amino compound activation through distillation, flash, or other similar processes, and the multi-stage process that contemplates the previously mentioned "activation", represent a second object of the present invention.

The new multi-stage process implies the use of one amino compound selected among urea, guanidine, guanine, arginine or other similar compound, as the only desulphurising agent to be used for the desulphurization reaction.

This new multi-stage procedure might also be carried out by "activating" a mixture of at least two of the previously mentioned amino compounds or, alternatively, by "activating" the amino compound or the mixture of at least two of the previously mentioned amino compounds also in presence of adjuvant substances for the "activation" itself. These adjuvant substances should be dosed in quantities below 20% compared to the weight mass of the used amino compound or compounds.

The substances that may be used, alone or in mixture, could be chosen particularly among ammonium carbamate, ammonia, carbon dioxide, ammonium carbonate, ammonium bicarbonate and other similar substances.

In fact, with this new multistage procedure it is possible to use, in addition to the amino compound, also ammonia-based compounds as long as in clearly reduced quantities, less than 20% compared to the weight mass, solving the same environmental, pollution and safety issues related to the production, transport, storage and handling of those compounds.

The multi-stage process where the amino compound, preferably urea, or the above stated mixture of at least two of the previously mentioned amino compounds, is "activated" through distillation, preferably includes:

Preparing a solution with a concentration between 40 and 60% m/v of the amino compound or of the above stated mixture of at least two of the previously mentioned amino compounds, preferably around 50%, and feeding it into a distiller;

Separately preparing a paste suspension with water with a liquid/solid ratio m/m between 0.5 and 2 and feeding it into a reactor;

Starting a distillation of the amino compound solution or of the above stated mixture of at least two of the previously mentioned amino compounds, at a temperature between 140° C. and 190° C. and pressure between 4 and 12 atm;

Conveying the obtained distillate as it is, or possibly condensed into the reactor containing the paste suspension, where the desulphurization reaction occurs at initial condition of ambient temperature and atmospheric pressure. At the end of the distillation of the amino compound solution in stoichiometric ratio with lead paste amount, the desulphurization reaction is preferably extended by around 30 minutes.

Also under such conditions, the desulphurization yields can even be higher than 99%.

The multi-stage process where the amino compound, preferably urea or the above stated mixture of at least two of the previously mentioned amino compounds, is "activated" through flash, preferably includes:

Preparing a solution with concentration between 40 and 60% m/v of the amino compound or of the above stated mixture of at least two of the previously mentioned amino compounds, preferably around 50%, and feeding it into a closed reactor without headspace and heated to a temperature between 170 and 190° C., preferably 180° C., and pressure between 8 and 12 atm, preferably 10 atm ca.

Separately preparing a paste suspension with water with a liquid/solid ratio m/m between 0.5 and 2 and feeding it to a reactor;

Feeding further solution of the "fresh" amino compound, possibly pre-heated, at the same concentration, into the closed reactor and forcing part of the heated solution to come out of the reactor itself;

Conveying the solution coming out of the closed reactor into the reactor containing the lead paste suspension, at a non-controlled temperature and under pressure, causing the flash of the heated solution of the amino compound or of the above stated mixture of at least two of the previously mentioned amino compounds, and the desulphurization reaction.

Also under such conditions, the desulphurization yields can be even higher than 99%.

At the end of the treatment, carried out in a single stage or multi-stage, the suspension filtration is carried out in order to separate the solution from the solid part. In case of treatment of materials containing lead sulphate, the solid part essentially consists of desulphurised lead compounds.

A washing phase of the solid compound is preferably required in order to remove solutes from the imbibition solution.

The filtered solution can be used in different ways: it can be concentrated to successively crystallize salts contained in it, predominantly ammonium sulphate. As an alternative, it can be used as such, after pH correction, in agriculture for fertirrigation techniques. This is possible because the main solute contained is the ammonium sulphate, which is a great fertilizer and the chemical characteristics of the solution respect the highest acceptable standards of National, European and International legislations for agricultural use.

In relation to the present invention, the two diagrams represented in FIGS. 1 and 2, which cannot be considered a limitation of the invention itself, are described as follows.

In FIG. 1, the desulphurization process is illustrated in one single stage.

The desulphurization stage is carried out by charging both the paste containing lead sulphate (1) and the amino compound (2) in aqueous solution inside a reactor (R). The suspension obtained after the desulphurization process (3) is composed of a solution containing ammonium sulphate and ammonium carbonate traces, and carbonated paste mainly composed of lead carbonate and lead oxides, which do not react with urea.

Via a solid/liquid (S/L) filtration, the two main resulting products are separated: lead carbonate (insoluble) (4) and ammonium sulphate (soluble) in a solution (5).

The ammonium sulphate solution, once filtered and deprived of any suspension, can be sent to a concentration and salts crystallization system, mainly ammonium sulphate. As an alternative, after pH correction, the solution can be used as such in agriculture for fertirrigation techniques.

Figure 2:
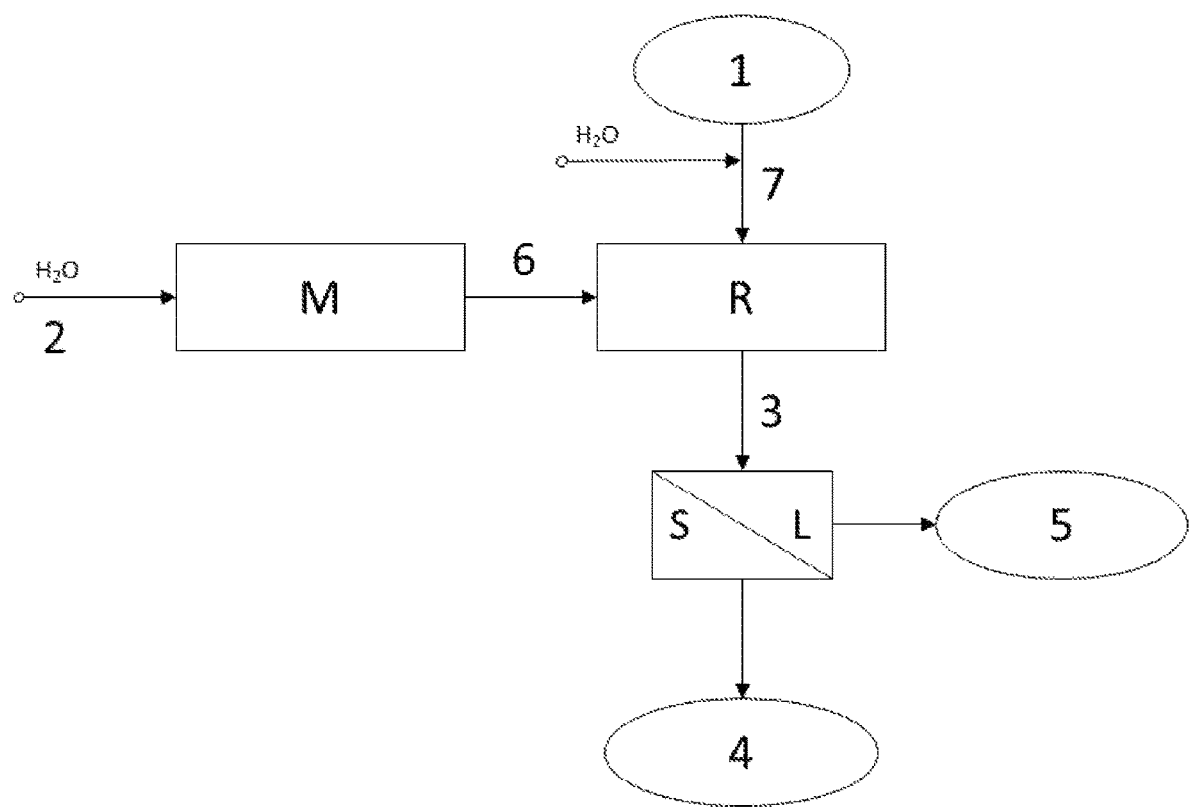

In FIG. 2, the desulphurization process is represented in multi-stage with pre-activation of the amino compound.

The amino compound (2) in an aqueous solution, before being sent to the desulphurization reactor (R), is "activated" through distillation or flash in a previous stage (M).

The activated amino compound (6) is fed to a desulphurising reactor (R), in which also a water suspension of lead paste (containing lead sulphate) (1) is charged.

The resulting suspension (3), composed of a solution containing ammonium sulphate and ammonium carbonate traces and carbonated paste, will be processed as in FIG. 1.

Hereinafter, some examples are provided in order to better understand the surprising simplicity and effectiveness of the present invention, and they cannot be considered a limitation of the invention itself.

EXAMPLE 1

The desulphurization operation is carried out, according to the diagram in FIG. 1, on lead paste extracted from exhausted lead acid batteries, with a 58% amount of lead sulphate.

1000 grams of lead paste, 130 grams of urea and 1.5 liters of water are charged into the reactor. The reactor is sealed and heated to a temperature of 150° C. ca.

At this temperature, pressure is 4.7 absolute atmospheres ca. The liquid/solid ratio m/m is 1.6 ca. When these conditions are fulfilled, the reaction is protracted for about one hour under the same conditions and, at the end of it, the reactor heating is turned off.

The resulting suspension is composed of a solution containing ammonium sulphate and ammonium carbonate traces, and carbonated paste mainly composed of lead carbonate and lead oxides which do not react with urea.

Only little traces of the initial lead sulphate will still result among the products. The conversion, and consequently the reaction yield, is higher than 95%, giving a greater added value to the lead paste compared to the original composition.

The solution, once filtered and deprived of any suspension, is sent to a concentration and crystallization system of salts, mainly represented by ammonium sulphate, or it is used as such, after PH correction, in fertirrigation plants.

EXAMPLE 2

The desulphurization operation is carried out, according to the diagram in FIG. 1, on lead paste extracted from exhausted lead acid batteries containing 65% amount of lead sulphate.

1000 grams of lead paste, 140 grams of urea and 1.5 liters of water are charged into a reactor. The reactor is closed and set up as described in example 1.

Reaction conditions are maintained for 4 hours and, at the end, the suspension is extracted and filtered in order to separate the solid phase from the liquid one.

The resulting desulphurised lead paste has a level of sulphates below 1%; as a consequence, the desulphurization yield is above 99%.

The liquid phase, once filtered and deprived of any suspension, is sent to a concentration and crystallization system of salts, mainly represented by ammonium sulphate, or it is used as such, after PH correction, in fertirrigation plants.

EXAMPLE 3

The desulphurization operation is carried out, according to the diagram in FIG. 2, on lead paste extracted from exhausted lead acid batteries with 58% amount of lead sulphate.

Differently from previous examples, the distillation of urea solution at 50% m/v occurs at a temperature of 150° C. and a pressure of 4.7 absolute atmospheres.

The condensed distillate is conveyed into a second reactor containing a water suspension of lead paste.

130 grams of urea are dissolved in 130 milliliters of water and poured into a distiller. 1000 grams of lead paste with 58% amount of lead sulphate are instead suspended in 850 milliliters ca. of water.

The distillate of urea solution is conveyed towards the lead paste suspension. Operative conditions of this reactor are free, meaning ambient temperature and atmospheric pressure. Liquid/solid ration m/m is 1 ca.

The reaction continues until the whole urea solution is distilled.

At the end of the distillation, the suspension agitation persists for about half an hour and it is eventually filtered.

The solid phase consists of desulphurised paste. Desulphurization yield is above 99%.

The solution, once filtered and deprived of any suspension, is sent to a concentration and crystallization system of salts, mainly represented by ammonium sulphate, or it is used as such, after PH correction, in fertirrigation plants. Thanks to this setup, it is possible to have a continuous-operating system configuration.

EXAMPLE 4

As in example 1 above, 1000 grams of lead paste with 58% amount of lead sulphate, 130 grams of urea and 1.5 liters of water are charged into the reactor.

The reactor is sealed and heated to a temperature of 180° C. ca. At this temperature, pressure is 10 absolute atmospheres ca. Liquid/solid ratio m/m is 1.6 ca. Once these conditions are fulfilled, the reaction is protracted for about 1 hour under the same conditions and, at the end, the reactor heating is turned off. After filtering the suspension and measuring the amount of sulphate residues in the lead paste, the desulphurization yield is above 99%.

The liquid phase, once filtered and deprived of any suspension, is sent to a concentration and crystallization system of salts, mainly represented by ammonium sulphate, or it is used as such, after PH correction, in fertirrigation plants.

EXAMPLE 5

As in Example 2 above, 1000 grams of lead paste with 65% level of lead sulphate, 140 grams of Urea and 1.5 liters of water are charged into the reactor. The reactor is sealed and heated to a temperature of 180° C. ca. At this temperature, the pressure is 10 absolute atmospheres ca. Liquid/solid ratio m/m is 1.6 ca. Once these conditions are fulfilled, the reaction is protracted for about one hour under the same conditions and, at the end, the reactor heating is turned off.

After filtering the suspension and measuring the amount of sulphate residues in the paste, the desulphurization yield is above 99%.

The liquid phase, once filtered and deprived of any suspension, is sent to a concentration and crystallization system of salts, mainly represented by ammonium sulphate, or it is used as such, after PH correction, in fertirrigation plants.

EXAMPLE 6

As in example 3 above, the lead paste suspension is not directly in contact with the solution containing dissolved urea, but it is placed into a different reactor.

A 50% urea solution is contained in a closed reactor without headspace, heated to a temperature of 180° C. ca and pressures of 10 atm ca. By feeding the "fresh" solution, part of the heated solution is forced to come out of the reactor.

This solution is conveyed into a reactor where the lead paste suspension is contained, at non-controlled temperature and under pressure.

Under these conditions, the flash of the heated urea solution occurs and the desulphurization reaction takes place. Once 130 grams of urea in solution are spilled, the reaction can be considered completed. After filtering the suspension and measuring the amount of sulphate residues in the lead paste, the calculated desulphurization yield is above 99%.

The liquid phase, once filtered and deprived of any suspension, is sent to a concentration and crystallization system of salts, mainly represented by ammonium sulphate, or it is used as such, after PH correction, in fertirrigation plants.

EXAMPLE 7

The desulphurization operation is carried out, according to the diagram in FIG. 2, on lead paste extracted from exhausted lead acid batteries with 58% amount of lead sulphate.

Differently from previous examples, the distillation of urea solution at 50% m/v occurs at a temperature of 150° C. and a pressure of 4.7 absolute atmospheres, in presence of an adjuvant substance, ammonium bicarbonate, in a quantity equal to 5% of the mass of urea.

The condensed distillate is conveyed into a second reactor containing a water suspension of lead paste.

130 grams of urea are dissolved in 130 milliliters of water and poured into a distiller. 1000 grams of lead paste with 58% amount of lead sulphate are instead suspended in 850 milliliters ca. of water.

The distillate of urea solution is conveyed towards the lead paste suspension. Operative conditions of this reactor are free, meaning ambient temperature and atmospheric pressure. Liquid/solid ration m/m is 1 ca.

The reaction continues until the whole urea solution is distilled.

At the end of the distillation, the suspension agitation persists for about half an hour and it is eventually filtered.

The solid phase consists of desulphurised paste. Desulphurization yield is above 99%.

The solution, once filtered and deprived of any suspension, is sent to a concentration and crystallization system of salts, mainly represented by ammonium sulphate, or it is used as such, after PH correction, in fertirrigation plants.

Thanks to this setup, it is possible to have a continuous-operating system configuration.

EXAMPLE 8

As in example 3 above, the lead paste suspension is not directly in contact with the solution containing dissolved urea, but it is placed into a different reactor.

The urea solution at 50% m/v, in presence of an adjuvant substance, ammonium carbonate, in a quantity equal to 5% of the mass of urea, is contained in a closed reactor without headspace, heated to a temperature of 180° C. ca and pressures of 10 atm ca. By feeding the "fresh" solution, the heated part of the solution is forced to come out of the reactor.

This solution is conveyed into a reactor where the lead paste suspension is contained, at non-controlled temperature and under pressure.

Under these conditions, the flash of the heated urea solution occurs and the desulphurization reaction takes place. Once 130 grams ca. of urea in solution are spilled, the reaction can be considered completed. After filtering the suspension and measuring the amount of sulphate residues in the lead paste, the calculated desulphurization yield is above 99%.

The liquid phase, once filtered and deprived of any suspension, is sent to a concentration and crystallization system of salts, mainly represented by ammonium sulphate, or it is used as such, after PH correction, in fertirrigation plants.

The invention claimed is:

1. A process for the desulphurization of materials and/or residues containing lead sulphate, wherein the only desulphurising agent is an amino compound selected among urea, guanidine, guanine or arginine, and where the process occurs in a single stage in a closed reactor where the amino compound in an aqueous solution between 20% and 50% m/v, reacts directly with the material that has to be desulphurised with the following operational conditions:
   temperature between 50 and 190° C.;
1. pressure between 1 and 12 atmospheres (atm);
   reaction time between 5 and 120 minutes (min); and
   liquid/solid ratio m/m between 0.5 and 4,
   obtaining a suspension at the end of the desulphurization reaction.

2. The process according to claim 1, where the amino compound is urea.

3. The process according to claim 1, where operational conditions are:
   temperature between 90 and 190° C.;
   pressure between 2 and 12 atm;
   reaction time between 10 and 100 min; and
   liquid/solid ratio between 1 and 4.

4. A process for the desulphurization of materials and/or residues containing lead sulphate, wherein the only desulphurising agent is an amino compound selected among urea, guanidine, guanine or arginine, or the desulphurising agent is a mixture of at least two amino compounds selected among urea, guanidine, guanine, or arginine, where the process is carried out in multiple stages where the amino compound, before reacting with the material that has to be desulphurised, is activated through a distillation or a flash, obtaining a suspension at the end of the desulphurization reaction.

5. The process according to claim 4, where the activated amino compound is mixed with one or more other amino compounds, the resulting mixture of the above mentioned amino compounds being activated through a distillation or a flash before its reaction with the material to be desulphurised.

6. The process according to claim 4, where the amino compound, or the mixture of the amino compounds, is activated through a distillation or a flash in presence of an adjuvant substance, in quantities below 20% of the weight mass of the amino compound itself.

7. The process according to claim 4, where the amino compound, or the mixture of the amino compounds, is activated through distillation, comprising:
preparing a solution with variable concentration between 40 and 60% m/v of amino compound, or of the mixture of the amino compounds, and feeding it into a distiller;
separately preparing a lead paste suspension with water, with a liquid/solid ratio m/m between 0.5 and 2 and feeding it to a reactor;
starting a distillation of the amino compound solution or of the mixture of the amino compounds, at a temperature between 140° C. and 190° C. and pressure between 4 and 10 atm; and
conveying the obtained distillate, optionally condensed, into the reactor containing the lead paste suspension to finalize the desulphurization reaction initially at ambient temperature and atmospheric pressure.

8. The process according to claim 7, where the desulphurization reaction is carried out up to half an hour after the end of the distillation of the amino compound or of the mixture of the amino compounds in stoichiometric quantity compared to lead sulphate.

9. The process according to claim 4, where the amino compound or the mixture of the amino compounds is activated through flash, comprising:
preparing a solution with concentration between 40 and 60% m/v of the amino compound or of the mixture of the amino compounds, and feeding it into a closed reactor without headspace heated to a temperature between 170 and 190° C. and pressure between 8 and 12 atm.
separately preparing a lead paste suspension with water with a liquid/solid ratio m/m between 0.5 and 2 and feeding it to a reactor;
feeding further fresh amino compound solution, optionally pre-heated, at the same concentration, into the closed reactor, forcing part of the solution already heated to come out of the reactor itself; and
conveying the solution coming out of the closed reactor into the reactor where the lead paste suspension is contained, at a non-controlled temperature and under pressure, causing these conditions the flash of the heated solution of the amino compound or of the mixture of the amino compounds and the desulphurization reaction.

10. The process according to claim 4, where lead sulphate residue is made of a lead paste fraction separated from exhausted lead acid batteries, or at least scrapped, having a paste with a lead sulphate content between 10 and 80% in weight.

11. The process according to claim 4, where the suspension obtained at the end of the desulphurization reaction is filtered to separate a solid phase from a liquid phase; the liquid phase, once filtered and deprived of any suspension, is sent to a concentration and crystallization system of salts, mainly represented by ammonium sulphate, or the liquid phase it is used as such, after pH correction, in fertirrigation plants.

12. The process according to claim 4, where the amino compound is urea.

13. The process according to claim 1, where lead sulphate residue is made of a lead paste fraction separated from exhausted lead acid batteries, or at least scrapped, having a paste with a lead sulphate content between 10 and 80% in weight.

14. The process according to claim 1, where the suspension obtained at the end of the desulphurization reaction is filtered to separate a solid phase from a liquid phase; the liquid phase, once filtered and deprived of any suspension, is sent to a concentration and crystallization system of salts, mainly represented by ammonium sulphate, or the liquid phase is used as such, after pH correction, in fertirrigation plants.

* * * * *